United States Patent
Park

(10) Patent No.: US 6,747,931 B1
(45) Date of Patent: Jun. 8, 2004

(54) METHOD FOR DISCRIMINATING TYPE OF OPTICAL RECORDING MEDIUM

(75) Inventor: Sang-On Park, Seongnam (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/552,706

(22) Filed: Apr. 19, 2000

(30) Foreign Application Priority Data

Apr. 19, 1999 (KR) ........................................ 1999/13797

(51) Int. Cl.[7] ................................................ G11B 7/00
(52) U.S. Cl. ................................................ 369/53.23
(58) Field of Search .......................... 369/44.11, 44.14, 369/44.17, 44.25, 44.26, 44.28, 53.23, 53.28, 44.27, 44.29, 53.11, 53.2, 53.22, 53.41, 116, 59.11, 59.13, 59.14, 59.17

(56) References Cited

U.S. PATENT DOCUMENTS

| | | | | | |
|---|---|---|---|---|---|
| 5,903,531 | A | * | 5/1999 | Satoh et al. | 369/44.29 |
| 5,966,355 | A | * | 10/1999 | Kamiyama | 369/44.27 |
| 6,061,318 | A | * | 5/2000 | Hwang | 369/53.23 |
| 6,327,234 | B1 | * | 12/2001 | Kamiyama et al. | 369/53.23 |
| 6,424,605 | B1 | * | 7/2002 | Iida | 369/44.27 |
| 6,487,153 | B2 | * | 11/2002 | Kamiyama et al. | 369/53.23 |

* cited by examiner

*Primary Examiner*—Thang V. Tran
*Assistant Examiner*—Bach Vuong
(74) *Attorney, Agent, or Firm*—Birch, Stewart, Kolasch & Birch LLP

(57) ABSTRACT

A method for discriminating a type of an optical recording medium including the steps of: checking a disk is mounted; performing a focus-searching by rotating a mounted disk by means of a recording/reproducing system for a specific disk to detect a focus search level, and identifying whether the currently mounted disk belongs to a specific type on the basis of the detected focus-search level; detecting an RF level and/or a focus error signal level by rotating the mounted disk, and identifying a type of the currently mounted disk on the basis of the detected signal. Also, a method for discriminating a type of an optical recording medium by detecting an RF signal and a focus error signal while performing a focus-searching as the optical recording medium is inserted, including: a first discriminating step for detecting a focus zero cross position from a focus error signal as inputted during focus-searching, and discriminating whether the optical recording medium belongs to a CD group or to a DVD group by using a level of a focus search wave form detected from the focus zero cross position; and a second discriminating step for discriminating whether the optical recording medium discriminated as the CD group disk or the DVD group disk in the above step is a reproducing-only recording medium or a recordable recording medium by using an RF signal level or a focus error signal level.

15 Claims, 11 Drawing Sheets

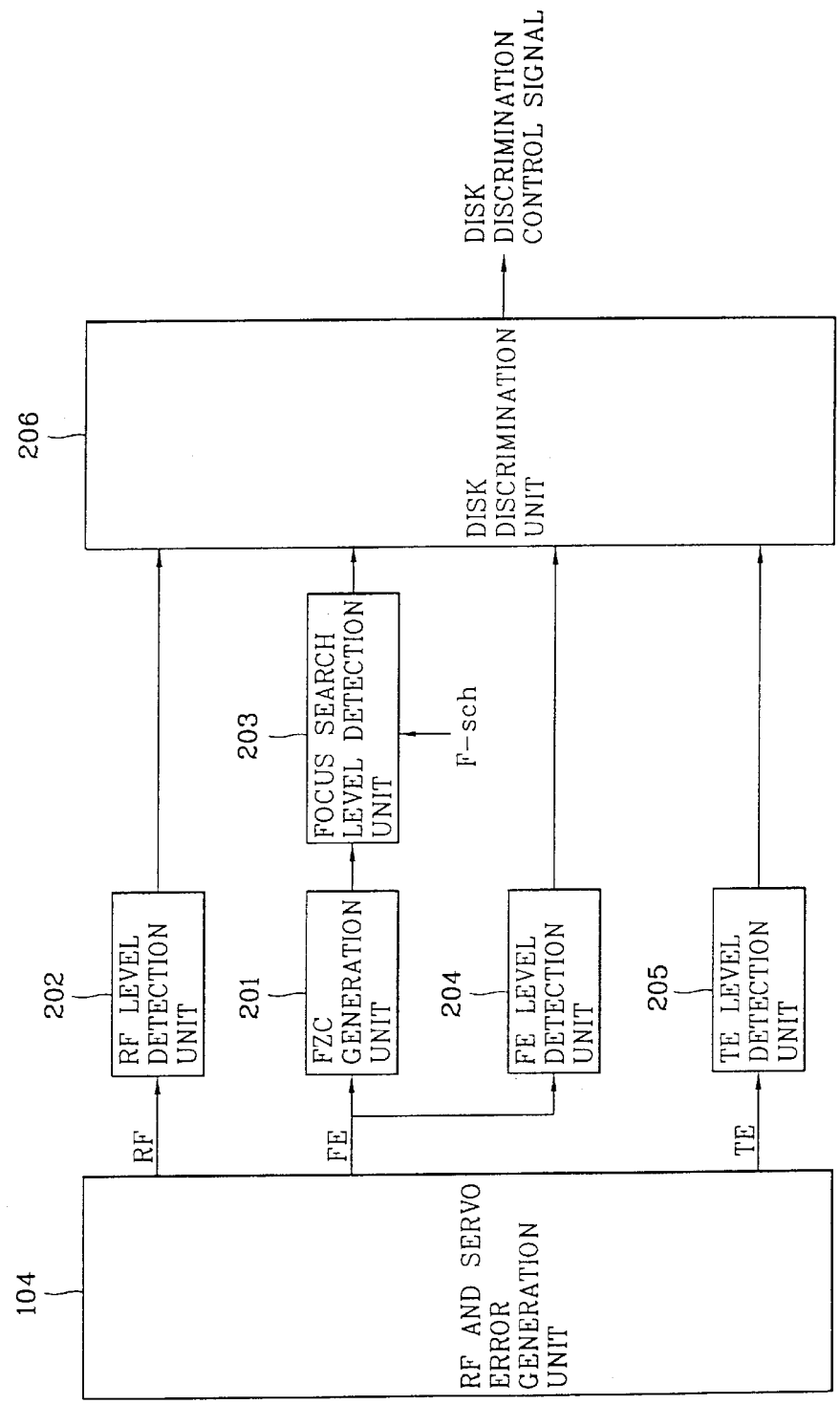

DVD-RAM

DVD-ROM

DVD-RW

FIG. 8

| | DVD | | | | CD | | |
|---|---|---|---|---|---|---|---|
| | RF | FE | FZC | TE | RF | FE | FZC | TE |
| CD-ROM | HIGH | HIGH | UP | NONE | HIGH | HIGH | CENTER | NONE |
| CD-R/ COLORING GROUP METAL GROUP | VERY LOW | VERY LOW | UP | | HIGH | HIGH | CENTER | |
| CD-RW | LOW | LOW | UP | | LOW | LOW | CENTER | NONE |
| DVD-ROM | HIGH | HIGH | CENTER | LOW | HIGH | HIGH | DOWN | |
| DVD-R | HIGH | HIGH | CENTER | LOW WBL NONE | HIGH | HIGH | DOWN | |
| DVD-RW | LOW | LOW | CENTER | LOW WBL PRESENCE | LOW | LOW | DOWN | |
| DVD-RAM | LOW | LOW | CENTER | HIGH WBL PRESENCE | LOW | LOW | DOWN | |

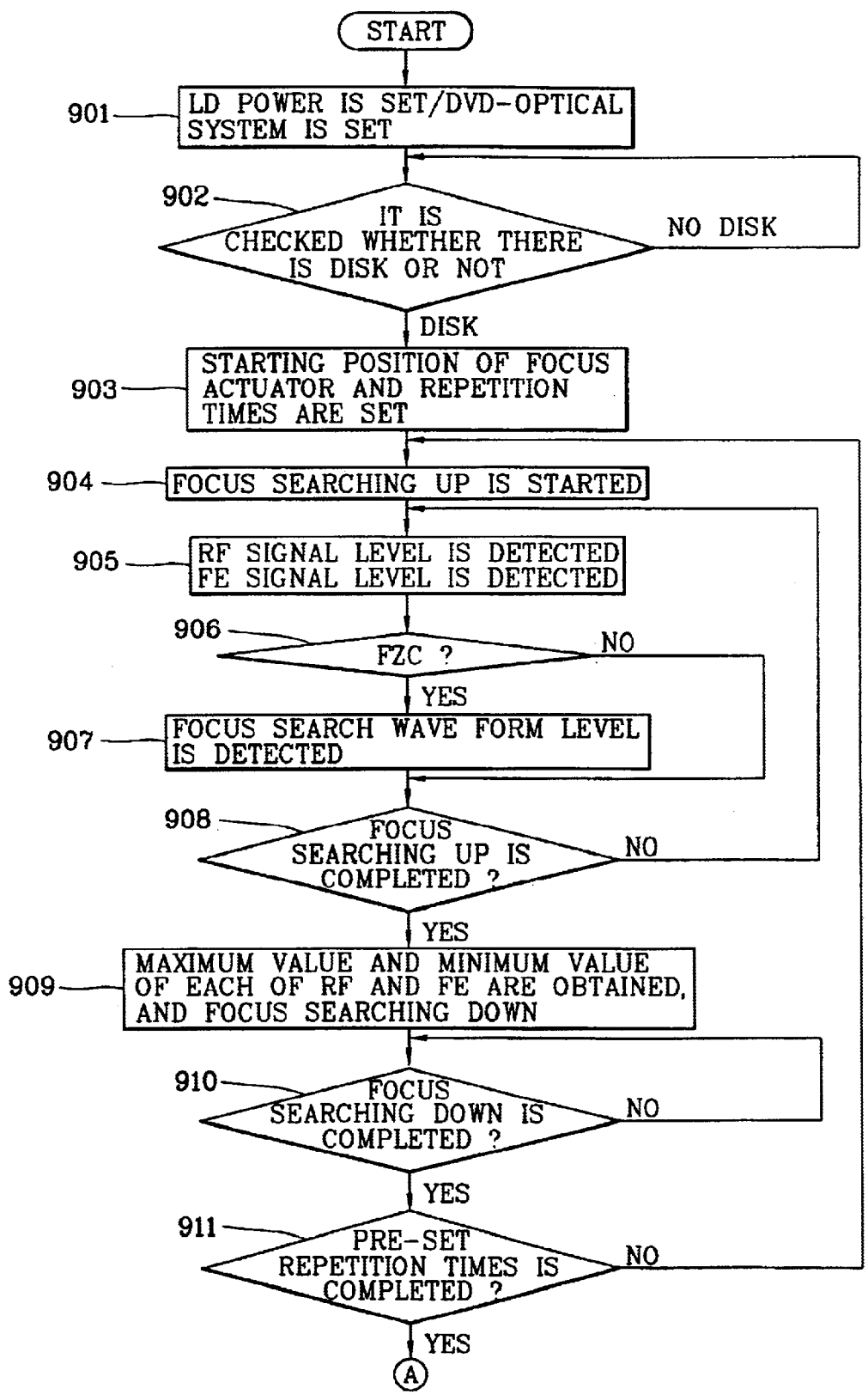

METHOD FOR DISCRIMINATING TYPE OF OPTICAL RECORDING MEDIUM

BACKGROUND OF THE INVENTION

1. Field of the Invention

The present invention relates to a method for discriminating a type of an optical recording media, and more particularly, to a method for discriminating types of optical recording mediums having different structures.

2. Description of the Background Art

Optical recording mediums, that is, optical disks, includes a ROM type for reading only, a WORM type capable of recording by one time, and a rewritable type disk capable of recording repeatedly.

The ROM type optical disk includes a compact disk read only memory (CD-ROM) and a digital versatile disk read only memory (DVD-ROM). The WORM type optical disk includes a recordable compact disk (CD-R) that is capable of recording by one time and a recordable digital disk (DVD-R) that is capable of recording by one time.

The disk capable of recording repeatedly includes rewritable compact disk (CD-RW) and a rewritable digital versatile disk (DVD-RW, DVD-RAM). Difference of the two is that in case of the DVD-RAM, data is recorded in both of a land and a groove, while, in case of the DVD-RW, data is recorded in the groove.

The various optical disks include a low reflection type disk and a high reflection type disk. Especially, the CD-R includes a metal group disk and a coloring group disk.

Meanwhile, a light source in use for an optical pick-up for DVD has a wave length of 635~650 nm (visible light, red color), and in order to read data from the CD-R, a light source having a wave length of 780 nm (infrared light) is required. In this respect, the data recorded in the CD-ROM can be read by the wave length of either 780 nm or 635~650 nm.

The DVD group disk has more compact recording density and shorter distance from the surface of the disk to the data recording face compared to the CD disk. The actual distance from the disk surface of the DVD disk to the data recording face is 0.6 mm, while that of the CD disk is 1.2 mm.

FIG. 1 is a schematic view showing a general construction of an optical recording/reproducing device which is capable of recording data in an optical disk and reproducing the recorded data therefrom.

As shown in the drawing, an optical pick-up 102 renders a light beam collected on an objective lens under the control of the servo controlling unit 106 to be placed on a signal track of an optical disk, collects again the light reflected on the signal recording face, and makes incident on an optical detector (not shown) to detect various signals.

The optical detector includes a plurality of optical detect devices. Electric signals in proportion to the quantity of light obtained by each optical detection device are outputted to an RF and servo error generation unit 104. The RF and servo error generation unit 104 detects an RF signal for reproducing a data, a focus error signal FE for servo-controlling or a tracking error signal TE from the electric signal outputted from the optical detector. The RF signal is outputted to a decoder 105 so as to be reproduced, and the servo error signal such as the FE and the TE are outputted to the servo controller 106. And, the control signal for recording a data is outputted to an encoder 103.

The encoder 103 encodes a data to be recorded to a recording pulse of a format as required by the optical disk 101 and records it in the optical disk 102 through the optical pick-up 102. The decoder 105 restores an original data from the RF signal.

A host such as a PC may be connected to the optical recording/reproducing device. The host transfers a recording/reproducing command through an interface 110 of the optical recording/reproducing device to a MICOM 111, transmits a data to be recorded to the encoder 103, and receives a reproduced data from the decoder 105. The MICOM 111 controls the encoder 103, the decoder 105 and the servo controlling unit 106 according to the recording/reproducing command.

As to the interface 110, an ATAPI (advanced technology attached packet interface) is typically used. The ATAPI refers to an interface standard between the optical recording/reproducing device such as a CD drive or a DVD drive and the host, which was proposed to transmit a data decoded in the optical recording/reproducing device to the host. The ATAPI serves to transmit the decoded data according to a protocol as defined in the host.

The servo controlling unit 106 processes the focus error signal FE and outputs a drive signal for focussing-controlling to a focus servo drive unit 107, and processes the tracking error signal TE and outputs a drive signal for tracking-controlling to a tracking servo drive unit 108. The focus servo drive unit 107 drives a focus actuator of the optical pick-up 102 to move the optical pick-up 102 upwardly and downwardly so that the optical disk 101 is rotated, tracing the up-down movement of the optical pick-up. That is, the focus actuator, which drives the objective lens collecting the light upwardly and downwardly, that is, in the focus axis direction, maintains evenly the distance between the objective lens and the optical disk 101 according to the focus control signal.

The tracking servo drive unit 108 drives the tracking actuator of the optical pick-up 102, according to which the objective lens of the optical pick-up 102 moves in the radial direction to the optical disk, thereby correcting a position of the light beam and following a predetermined track.

If the optical recording/reproducing device is a CD drive, what is needed is to discriminate a type of CD, that is, whether it is a high reflection disk or a low reflection disk. But, if it is the DVD drive (i.e., DVD-RAM system), it should be able to reproduce CD group disk as well as DVD group disk, considering that CD group software is vastly used.

Therefore, when the optical disk is inserted, it is necessary for the DVD drive to discriminate whether the inserted disk is the CD group disk or the DVD group disk, whether the discriminated disk in the same group is of a low reflection or a high reflection, or whether it is a reproducing-only type or a recordable type, so that the DVD drive can perform a suitable servo operation. Namely, without discriminating types of the disk, the servo wouldn't be operated properly and it takes a long time to stabilize the servo operation. The reason for this is that servo error signal characteristics are different for disk types.

In this respect, since the RF level of the optical disk is different in terms of reflectivity, in the conventional art, whether it is a low reflection or a high reflection is judged by sensing the RF level. For example, in case of the DVD group disk, the size of the RF level is as follows: DVD-ROM>DVD-RW>DVD-RAM.

However, as to the method for discriminating types of disks of the conventional art, the reflectivity of the high reflection disk may be lowered down, and if it is actually lowered down for a cause, there is a high possibility that the lowered-down high reflection disk is misjudged as a low reflection disk.

In addition, since deflections are wide-ranged for disks, it may occur that there is no difference between RF levels of different disks. Especially, in case of the CD-R and the CR-ROM, since the both have a great reflectivity, it is not easy to set a threshold value for differentiating the two disks.

As described above, the method for discriminating types of disks by using the RF level of the conventional art has the problem in that an error may occur in differentiating disks, making it difficult to discriminate disks accurately. In addition, it takes a long time to stabilize the servo operation, degrading the performance of the system.

SUMMARY OF THE INVENTION

Therefore, an object of the present invention is to provide a method for discriminating a type of an optical recording medium which is capable of discriminating a DVD group disk and a CD group disk on the basis of a reference level of a focus search wave form.

Another object of the present invention is to provide a method for discriminating a type of an optical recording medium which is capable of discriminating a recordable disk and reproducing-only disk of the same group on the basis of a level of a focus error signal.

Still another object of the present invention is to provide a method for discriminating a type of an optical recording medium which is capable of discriminating a DVD-RAM and a DVD-RW of a DVD group on the basis of a level of a tracking error signal obtained by free running.

To achieve these and other advantages and in accordance with the purposed of the present invention, as embodied and broadly described herein, there is provided a method for discriminating a type of an optical recording medium including the steps of: identifying whether a disk is mounted; performing a focus-searching by rotating a mounted disk by means of a recording/reproducing system for a specific disk to detect a focus search level, and identifying whether the currently mounted disk belongs to a specific type on the basis of the detected focus-search level; and detecting an RF level and/or a focus error signal level by rotating the mounted disk, and identifying a type of the currently mounted disk on the basis of the detected signal.

In order to achieve the objects of the present invention, there is provided a method for judging a type of a disk to be currently recorded and reproduced among a plurality of disks of different physical characteristics, including the steps of: identifying whether a disk is mounted; performing a focus-searching by rotating a mounted disk by means of a recording/reproducing system for a specific disk to detect a focus search level, and identifying whether the currently mounted disk belongs to a specific type on the basis of the detected focus-search level; detecting an RF level and/or a focus error signal level by rotating the mounted disk, and identifying a type of the currently mounted disk on the basis of the detected signal.

In order to achieve the above objects, there is provided a method for performing a focus-searching to detect an RF signal and a focus error signal as an optical recording medium is inserted, and discriminating a type of an optical recording medium as inserted, including: a first discriminating step for detecting a focus zero cross position from a focus error signal as inputted during focus-searching, and discriminating whether the optical recording medium belongs to a CD group or to a DVD group by using a level of a focus search wave form detected from the focus zero cross position; and a second discriminating step for discriminating whether the optical recording medium discriminated as the CD group disk or the DVD group disk in the above step is a reproducing-only recording medium or a recordable recording medium by using an RF signal level or a focus error signal level.

According to the method for discriminating a type of an optical recording medium by detecting an RF signal and a focus error signal while performing a focus-searching as the optical recording medium is inserted in the present invention, in the first discriminating step, a reference level is set for the focus search wave form, and the level of the detected focus search wave form is compared with the reference level, to thereby discriminate the CD group disk or the DVD group disk.

According to the method for discriminating a type of an optical recording medium by detecting an RF signal and a focus error signal while performing a focus-searching as the optical recording medium is inserted in the present invention, if the level of the detected focus search wave form is higher than the pre-set reference level, the inserted optical recording medium is judged as the CD group disk, while if it is lower than the pre-set reference level, the inserted optical recording medium is judged as the DVD group disk.

According to the method for discriminating a type of an optical recording medium by detecting an RF signal and a focus error signal while performing a focus-searching as the optical recording medium is inserted in the present invention, if no focus zero cross position is detected from the focus error signal, the inserted optical recording medium is judged as the CD group disk.

According to the method for discriminating a type of an optical recording medium by detecting an RF signal and a focus error signal while performing a focus-searching as the optical recording medium is inserted in the present invention, in case that the inserted optical recording medium is discriminated as the CD group disk, CD-ROM, CD-R and CD-RW are discriminated on the basis of the level of the RF and the FE detected by using a light source of the DVD group disk in the second discriminating step.

According to the method for discriminating a type of an optical recording medium by detecting an RF signal and a focus error signal while performing a focus-searching as the optical recording medium is inserted in the present invention, threshold values Vth1 and Vth2 (Vth1>Vth2) are set for the RF levels detected for the CD-ROM, CD-R and CD-RW, on which if the detected RF level is greater than Vth1, the inserted optical recording medium is judged as the CD-ROM, if the detected RF level is smaller than Vth1 and greater than Vth2, it is judged as the CD-R, and if the detected RF level is smaller than Vth2, it is judged as the CD-RW.

According to the method for discriminating a type of an optical recording medium by detecting an RF signal and a focus error signal while performing a focus-searching as the optical recording medium is inserted in the present invention, threshold values Vth3 and Vth4 (Vth3>Vth4) are set for the FE levels detected for the CD-ROM, CD-R and CD-RW, on which if the detected FE level is greater than Vth3, the inserted optical recording medium is judged as the CD-ROM, if the detected FE LEVEL is smaller than Vth3 and greater than Vth4, it is judged as the CD-R, and if the detected FE level is smaller than Vth4, it is judged as the CD-RW.

According to the method for discriminating a type of an optical recording medium by detecting an RF signal and a focus error signal while performing a focus-searching as the optical recording medium is inserted in the present invention, in case that the inserted optical recording medium is judged as the CD-R, a threshold value Vth5 is set for the RF level detected from the CD-R, on which if the detected RF level is greater than the threshold value, the inserted optical recording medium is judged to belong to a CD-R metal group, while if the detected RF level is below the threshold value, it is judged to belong to a CD-R coloring group.

According to the method for discriminating a type of an optical recording medium by detecting an RF signal and a focus error signal while performing a focus-searching as the optical recording medium is inserted in the present invention, in case that the inserted optical recording medium is discriminated as the CD-R group disk, a threshold value Vth6 is set for the FE level detected from the CD-R, based on which if a detected FE level is higher than the threshold value, the inserted disk is judged as the CD-R metal group disk, while if the detected FE level is lower than the threshold value, the inserted disk is judged as the CD-R coloring group disk.

According to the method for discriminating a type of an optical recording medium by detecting an RF signal and a focus error signal while performing a focus-searching as the optical recording medium is inserted in the present invention, in case that the inserted optical recording medium is discriminated as the DVD group disk in the first discriminating step, the DVD-ROM, DVD-R, DVD-RW and DVD-RAM are discriminated from the levels of the RF and FE detected by using a light source of DVD group disk.

According to the method for discriminating a type of an optical recording medium by detecting an RF signal and a focus error signal while performing a focus-searching as the optical recording medium is inserted in the present invention, threshold values Vth1 and Vth2 are set for the RF levels detected for the DVD-ROM, DVD-R, DVD-RW and DVD-RAM, on which if a detected RF level is greater than Vth1, the inserted optical recording medium is judged as the DVD-ROM or the DVD-R, if a detected RF level is smaller than Vth1 and greater than Vth2, the inserted optical recording medium is judged as the DVD-RW, and if a detected RF level is smaller than Vth2, the inserted optical recording medium is judged as the DVD-RAM.

According to the method for discriminating a type of an optical recording medium by detecting an RF signal and a focus error signal while performing a focus-searching as the optical recording medium is inserted in the present invention, threshold values Vth3 and Vth4 (Vth3>Vth4) are set for FE levels detected for the DVD-ROM, DVD-R, DVD-RW and DVD-RAM, on which if a detected FE level is greater than Vth3, the inserted optical recording medium is judged as the DVD-ROM or the DVD-R, if a detected FE level is smaller than Vth3 and greater than Vth4, the inserted optical recording medium is judged as the DVD-RW, and if a detected FE level is smaller than Vth4, the inserted optical recording medium is judged as the DVD-RAM.

According to the method for discriminating a type of an optical recording medium by detecting an RF signal and a focus error signal while performing a focus-searching as the optical recording medium is inserted in the present invention, in case that the inserted optical recording medium is judged as the DVD-ROM or the DVD-R, if there is a WBL, the inserted optical recording medium is judged as the DVD-R, while if there is no WBL, the inserted optical recording medium is judged as the DVD-ROM.

According to the method for discriminating a type of an optical recording medium by detecting an RF signal and a focus error signal while performing a focus-searching as the optical recording medium is inserted in the present invention, when the optical recording medium inserted in the first discriminating step is discriminated as the DVD group disk, the DVD-ROM, the DVD-RW and the DVD-RAM are judged on the basis of the level of the tracking error signal obtained by free running.

According to the method for discriminating a type of an optical recording medium by detecting an RF signal and a focus error signal while performing a focus-searching as the optical recording medium is inserted in the present invention, threshold values Vth1 and Vth2 (Vth1>Vth2) are set for tracking error levels detected for the DVD-ROM, DVD-RW and DVD-RAM, on which if a detected tracking error level is greater than Vth1, the inserted optical recording medium is judged as the DVD-RAM, if a detected tracking error level is smaller than Vth1 and greater than Vth2, the inserted optical recording medium is judged as the DVD-RW, and if a detected tracking error level is smaller than Vth2, the inserted optical recording medium is judged as the DVD-ROM.

These and other objects of the present application will become more readily apparent from the detailed description given hereinafter. However, it should be understood that the detailed description and specific examples, while indicating preferred embodiments of the invention, are given by way of illustration only, since various changes and modification within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 is a schematic block diagram of an apparatus for discriminating a type of an optical recording medium in accordance with the present invention;

FIG. 8 is a comparison table showing variations of RF, FE, FZC, TE and WBL according to type of an optical disk in accordance with the present invention; and FIGS. 9A and 9B are flow charts of a process of a method for discriminating a type of an optical disk in accordance with the present invention.

DETAILED DESCRIPTION OF THE PREFERRED EMBODIMENTS

Figure 1:
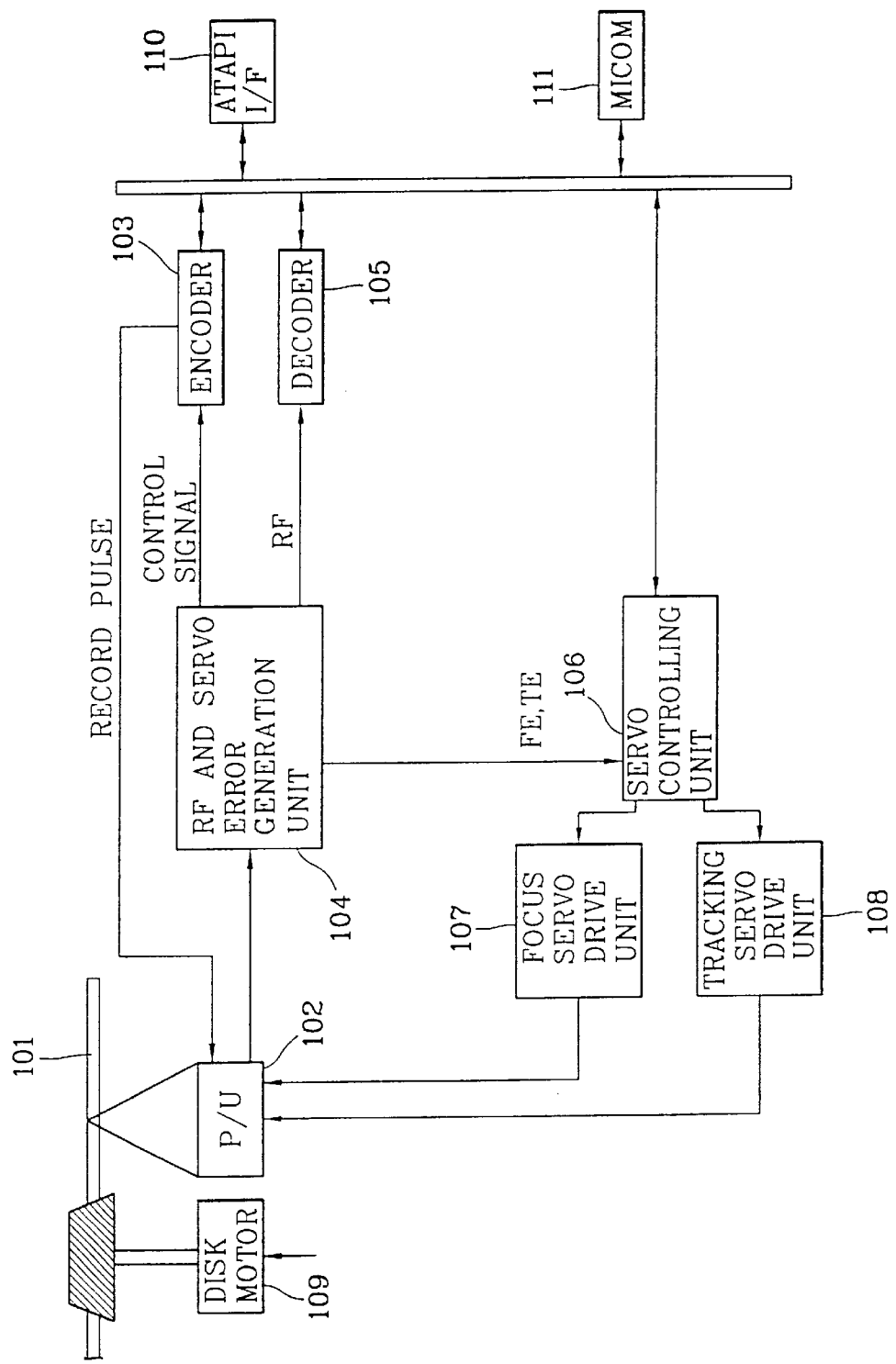
FIG. 1 is a schematic block diagram of a general optical disk recording/reproducing device in accordance with a conventional art.

Reference will now be made in detail to the preferred embodiments of the present invention, examples of which are illustrated in the accompanying drawings.

The present invention is directed to discriminating a DVD group and a CD group on the basis of levels of a focus search wave form detected at an FZC position, discriminating whether the above discriminated disk in the same group is a recordable disk on the basis of the level of a focus error signal, and discriminating a DVD-RAM and a DVD-RW in the DVD group on the basis of a level of a tracking error signal obtained by free running.

A method for discriminating a type of an optical recording medium in accordance with the present invention will now be described with reference to the accompanying drawings.

FIG. 2 is a schematic block diagram of an apparatus for discriminating a type of an optical recording medium in accordance with the present invention.

As shown in the drawing, the apparatus for discriminating a type of an optical recording medium includes an FZC generation unit 201 for detecting a focus zero cross (FZC) position from a focus error signal FE inputted from an RF and servo error generation unit 104; an RF level detection unit 201 for detecting a level of an RF signal inputted from the RF and servo error generation unit 104; a focus search level detection unit 203 for detecting a level of a focus search wave form (F-sch) inputted at the FZC position; an FE level detection unit 204 for detecting a level of a focus error signal FE inputted from the RF and servo error generation unit 104; a TE level detection unit 206 for detecting a level of an inputted tracking error signal TE; and a disk discriminating unit 206 for discriminating a type of a disk by using the levels of the signals outputted from each unit 202~205. All these elements are operatively coupled.

Figure 3A:
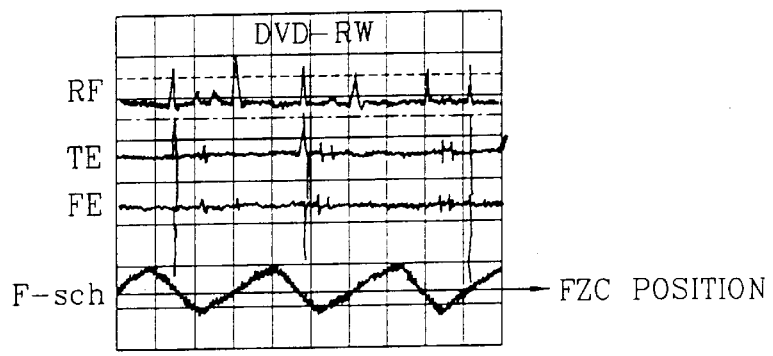
FIGS. 3A through 3C show wave forms of a disk of a DVD group detected by using an optical system and a light source fit to the DVD group in accordance with the present invention.
Figure 3B:
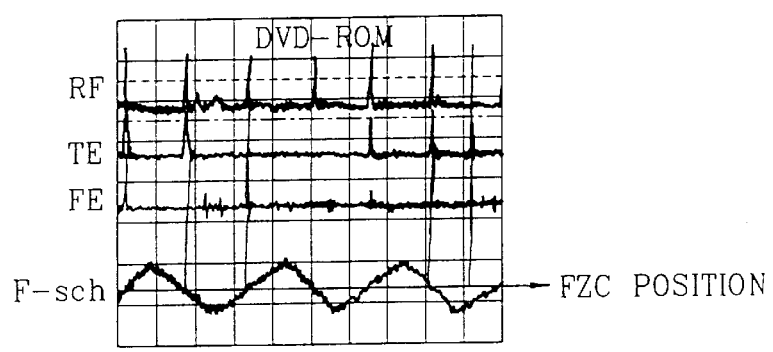
Figure 3C:
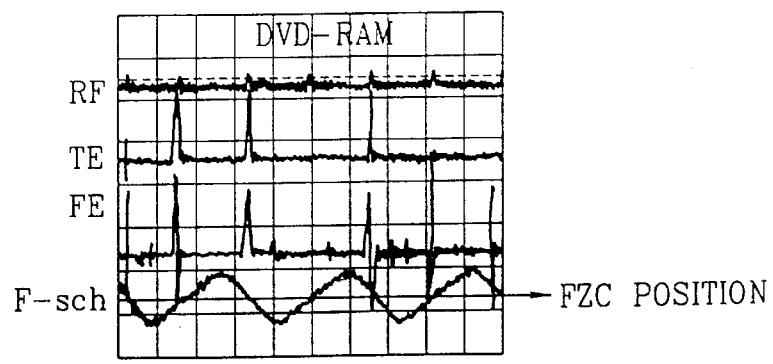

FIGS. 3A through 3C show examples of wave forms of a disk in a DVD group detected by using an optical system and a light source fit to the DVD group in accordance with the present invention, of which FIG. 3A sequentially illustrates an RF, a TE, an FE and a focus search wave form (F-sch) detected when a DVD-RW disk is inserted, FIG. 3B sequentially illustrates an RF, a TE, an FE and a focus search wave form (F-sch) detected when a DVD-ROM disk is inserted, and FIG. 3C sequentially illustrates an RF, a TE, an FE and a focus search wave form (F-sch) detected when a DVD-RAM disk is inserted.

Figure 4A:
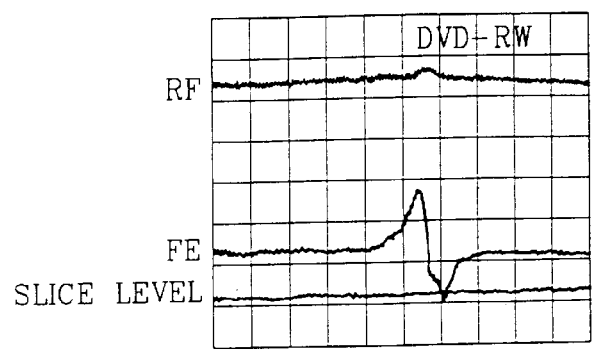
FIGS. 4A through 4C are enlarged wave forms of an arbitrary position of FIGS. 3A through 3C in accordance with the present invention.
Figure 4B:
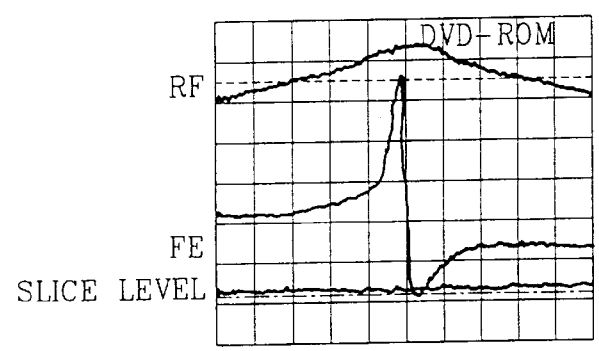
Figure 4C:
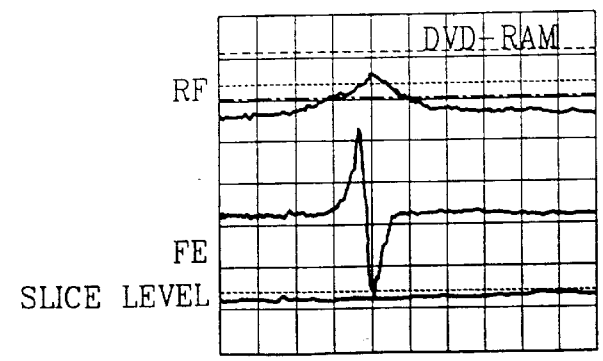

FIGS. 4A through 4C show enlarged portions of the wave forms of FIGS. 3A through 3C, respectively, at arbitrary positions.

Figure 5A:
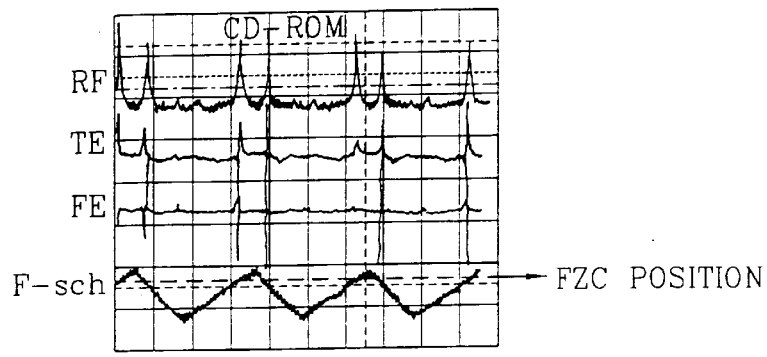
FIGS. 5A through 5D show wave forms of a disk of a CD group detected by using an optical system and a light source fit to the DVD group in accordance with the present invention.
Figure 5B:
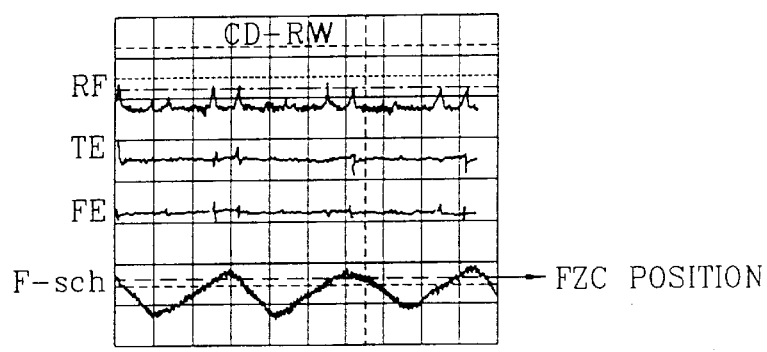
Figure 5C:
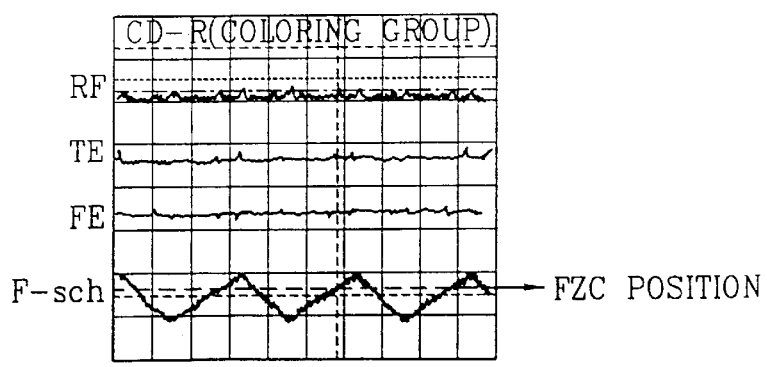
Figure 5D:
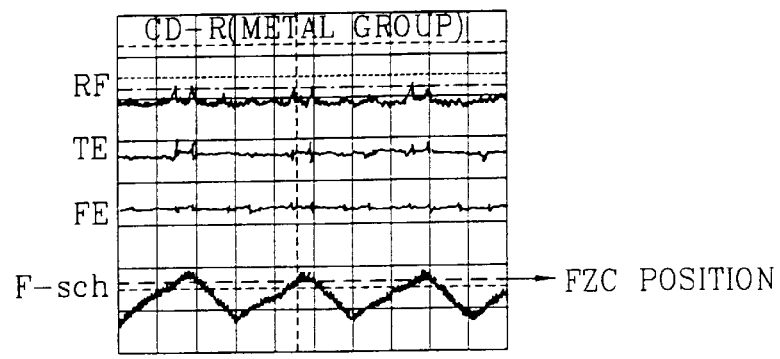

FIGS. 5A through 5C show wave forms of a disk of a CD group detected by using an optical system and a light source fit to the DVD group in accordance with the present invention, of which FIG. 5A sequentially illustrates an RF, a TE, an FE and a focus search wave form (F-sch) detected when a CD-ROM is inserted, FIG. 5B sequentially illustrates an RF, a TE, an FE and a focus search wave form (F-sch) detected when a CD-RW is inserted, FIG. 5C sequentially illustrates an RF, a TE, an FE and a focus search wave form (F-sch) detected when a CD-R (coloring group) is inserted, and FIG. 5D sequentially illustrates an RF, a TE, an FE and a focus search wave form (F-sch) detected when a CD-R (metal group) is inserted.

FIGS. 6A through 6D show enlarged portions of the wave forms of FIGS. 5A through 5D, respectively, at arbitrary positions in accordance with the present invention.

Figure 7A:
FIGS. 7A through 7C show wave forms of a disk of a DVD group detected during free running in accordance with the present invention.
Figure 7B:
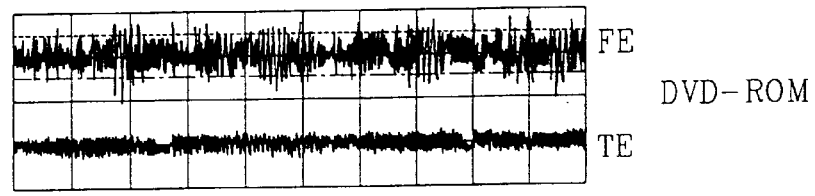
Figure 7C:
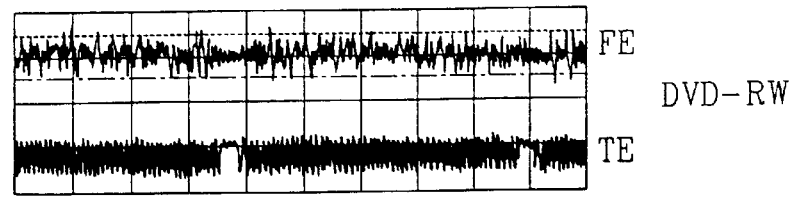

FIGS. 7A through 7C show examples of wave forms of a disk of a DVD group detected during free running in accordance with the present invention, of which FIG. 7A sequentially illustrates an FE and a TE wave form when the DVD-RAM is inserted, FIG. 7B sequentially illustrates an FE and a TE wave form when the DVD-ROM is inserted, and FIG. 7C sequentially illustrates an FE and a TE wave form when the DVD-RW is inserted.

FIG. 8 is an example of a comparison table showing variations of RF, FE, FZC, TE and WBL according to the type of an optical disk in accordance with the present invention, based on which a type of a disk is discriminated in the present invention.

Figure 9B:
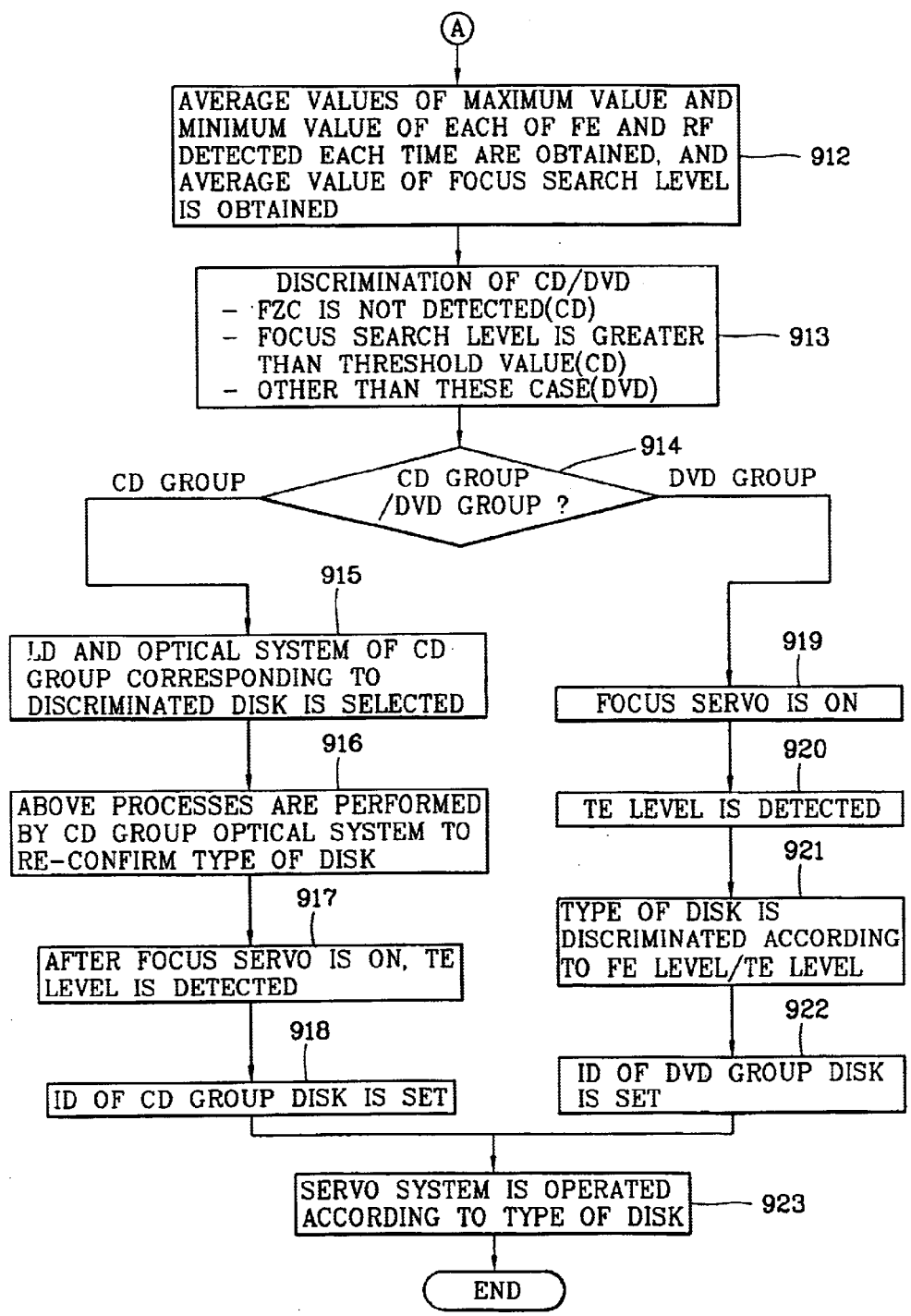

FIGS. 9A and 9B are flow charts of a process of a method for discriminating a type of an optical disk in accordance with the present invention. The method for discriminating a type of an optical disk in accordance with the present invention will now be described with reference to FIGS. 9A and 9B.

In the apparatus constructed according to the present invention, when a power is ON for its drive, an LD power and an arbitrary optical system are set as an initial set value (stage: 901). In one embodiment of the present invention, it is assumed that the DVD optical system is set. And, it is checked whether or not there is a disk (stage: 902). That is, it is judged whether a disk was mounted for the set optical system after a disk was inserted. If it is judged that a disk was mounted, a focus actuator is set at an initial position and a type of the disk is discriminated. In this respect, in terms of accuracy with respect to discriminating the disk, a number of repetition times for discrimination is set (stage: 903).

Subsequently, the optical pick-up 102 starts focus-searching, that is, a focus-searching up, under the control of the servo controlling unit 106 (stage: 904). Simultaneously, the RF and servo error generation unit 104 detects an RF signal, a focus error signal FE or a tracking error signal TE from an electric signal outputted from the optical detector of the optical pick up 102 and outputs the RF signal to the RF level detection unit, the FE signal to the FZC generation unit 201 and to the FE level detection unit 204, and the TE signal to the TE level detection unit 205. Upon receipt of the FE signal, the FZC generation unit 201 detects a position where the FE signal becomes '0' as the FZC position, that is, a position of a corner stone, and outputs it to the focus search level detection unit 203.

At this time, since the FZC may or may not be generated according to the type of disks, the RF level detection unit 202 detects the level of the inputted RF signal and the FE level detection unit 204 detects the level of the inputted FE signal during searching up, and respectively output the signals to the disk discriminating unit 206 (stage: 905).

And, when an FZC position is detected by the FZC generation unit 201 (stage: 906), the focus search level detection unit 203 detects a voltage level of the focus search wave form at the FZC position and outputs it to the disk discriminating unit 206 in order to discriminate whether the inserted disk belongs to the CD group or the DVD group (stage: 907).

At this time, in case that the FE level is low, the FZC may not be detected. Accordingly, if no FZC is detected at the stage 906, the voltage level of focus search wave form would not be detected. Thus, in this case, it is marked that no focus search level was detected.

Subsequently, it is judged whether the focus-searching up was completed (stage: 908).

At this time, if it is judged that the focus-searching up was not completed, it returns to the stage 905 and the following processes are performed, so that the RF, the FE and the focus search wave form are successively detected during the focus-searching up interval.

Meanwhile, if it is judged that the focus searching up was completed, the disk discriminating unit 206 obtains and stores a maximum value and a minimum value, that is, peak-to-peak voltages, of the inputted FE level and the RF level in order to discriminate the type of the disk in the same group as discriminated by the level of the focus search voltage wave form, and executes focus searching down to the initial position (stage: 909).

After the focus searching down is completed (stage: 910), it is judged whether the number of repetition times set at the stage 903 was completed. If the number of repetition times was not completed, it returns to the stage 903 (stage: 911). That is, the stages 904~911 are repeatedly performed as many as the number of repetition times set at the stage 903. And then, an average value of the maximum value and an average value of the minimum value are obtained for each of the FE and the RE detected each time, and an average value of the focus search wave form voltage level is also obtained (stage: 912).

After the above processes are performed, the disk discriminating unit 206 discriminates a type of the inserted disk by using the data (stage: 913). That is, in the present invention, when a disk is inserted, focus searching is first performed to discriminate whether the inserted disk belongs to the CD group or to the DVD group. In this respect, the focus searching refers to searching a position which is the best focused by moving the objective lens within the optical pick-up in the up-and-down direction, that is, in the focus axis direction, for which a wave form of the voltage applied to the focus actuation is called a focus search wave form (F-sch). At this time, the image focused on the optical detector is changed depending on the focus state. The position where a focus error signal is '0', that is, the position which is the best focused is called FZC position. Namely, the FZC position is a slicing position by taking the focus error signal as a reference level.

Accordingly, in the present invention, while focus searching is performed by the light source (i.e., 650 nm or 635 nm) outputted from a DVD laser diode, the discrimination is made whether the inserted disk belongs to the CD group or to the DVD group by using the voltage level of the focus search wave form detected at the FZC position. In this respect, a light source having a 780 nm wave length, that is, a CD light source, may be used, but in the present invention, a DVD light source is used with its advantage of better distinction because its wave length and focal length are short.

That is, referring to the FZC positions of the DVD group disks as shown in FIGS. 3A through 3C and the FZC positions of the CD group disks as shown in FIGS. 5A through 5D, it is noted that the FZC positions of the DVD group disk and of the CD group disk are different from each other due to the structural difference (i.e., CD is of 1.2 nm and DVD is of 0.6 nm), while those disks belonging to the same group have the same positions. Accordingly, the disk discriminating unit 206 compares the voltage level of the focus search wave form detected at the FZC position with an arbitrarily pre-set threshold value, thereby judging whether the inserted disk belong to the CD group or to the DVD group. For example, if the voltage level of the focus search wave form detected at the FZC position is greater than the pre-set threshold value, it is judged as the CD group disk; or if the voltage level of the focus search wave form detected at the FZC position is smaller than the pre-set threshold value, it is judged as the DVD group disk. Meanwhile, if the FE level is so low that no FZC is generated (referring to FIGS. 6B through 6D), no focus search level is detected. In this case, it is judged as the CD group disk.

After discriminating the CD group disk or the DVD group disk, it is necessary to discriminate whether it is a reproducing only disk or a recordable disk as they belong to the same group. In the same group, a disk can be discriminated by using the Vpp of the FE signal or the normalized factor of the RF level.

First, the CD group will now be described with reference to FIGS. 5A through 5D or FIGS. 6A through 6D.

Figure 6A:
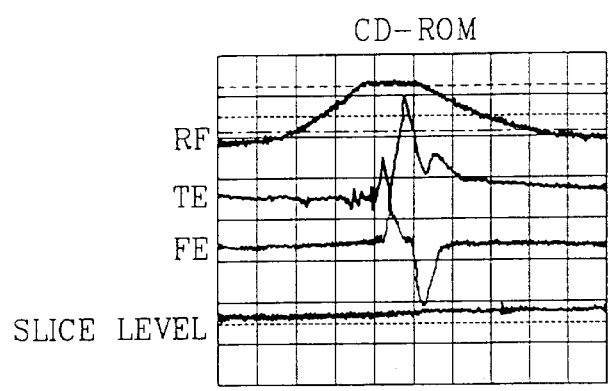
FIGS. 6A through 6D show enlarged wave forms of an arbitrary position of FIGS. 5A through 5D in accordance with the present invention.
Figure 6B:
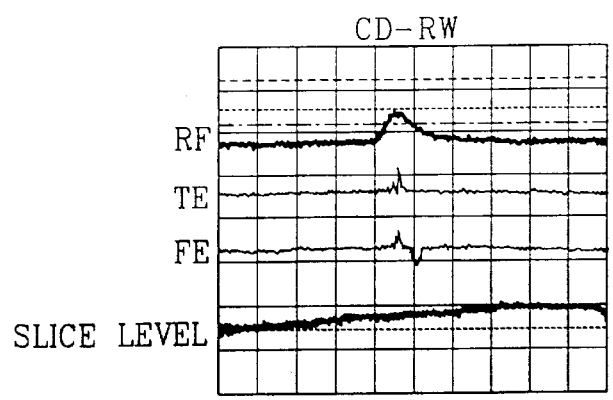

Referring to FIGS. 5A and 6A, in case of the CD-ROM, the maximum value and the minimum value, that is, the Vpp of the FE and of the RF is great for the wavelength of 650 nm or the wavelength of 780 nm. And, referring to FIGS. 5B and 6B, in case of the CD-RW, the Vpp of the FE and the RF has some size (some level) for the wave length of 650 nm but has the smallest value for the 780 nm wavelength.

Figure 6C:
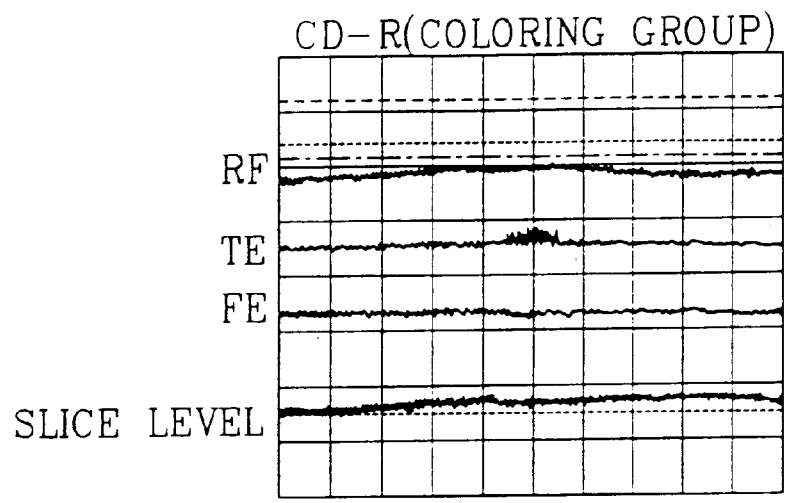
Figure 6D:
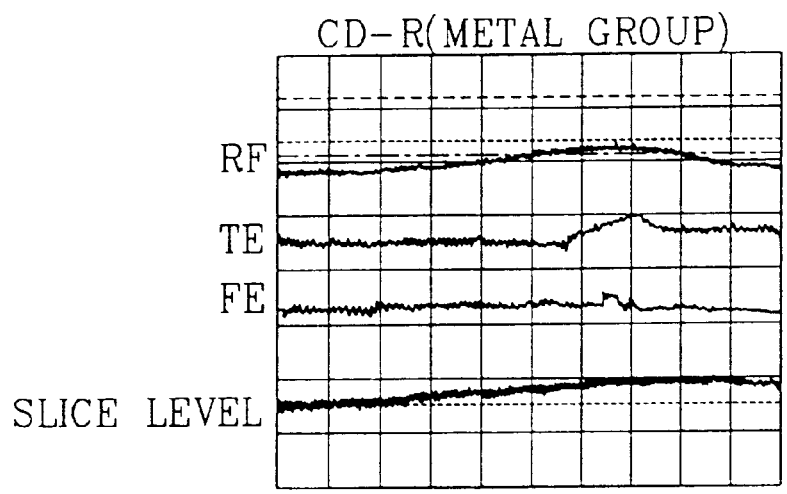

Meanwhile, in case of the CD-R, as shown in FIGS. 5C and 6C, since the coloring group has no reflectivity, the Vpp of the FE and of the RF has the smallest value for the wave length of 650 nm. This is the same for the metal group of the CD-R. But, for the wave length of 780 nm, the Vpp of the FE and of the RF is great in both the coloring group and the metal group.

Namely, the CD-ROM is a little dependent on the wave length of the laser diode (LD), while the CD-RW and the CD-R are susceptible to the wave length characteristic of the laser diode. Accordingly, in case of the DVD light source having 650 nm wavelength, the Vpp of the FE and the RF is obtained in the sequential order of CD-ROM>CD-RW>CD-R. Therefore, after a plurality of threshold values are set differentiating the CD-ROM, the CD-RW and the CD-R, when the Vpp of the FE or the Vpp of the RF is compared with the threshold values, a type of a CD can be discriminated.

For example, on the assumption that the threshold values are set as Vth1 and Vth2 for the FE signal and Vth1 is greater than Vth2, if the Vpp of the FE signal measured by the DVD optical system is greater than Vth1, a type of the inserted disk is discriminated as the CD-ROM; if the Vpp of the FE signal measured by the DVD optical system is smaller than Vth1 and greater than Vth2, a type of the inserted disk is discriminated as the CD-RW; and if the Vpp of the FE signal measured by the DVD optical system is smaller than Vth2, a type of the inserted disk is discriminated as the CD-R. After the type of the inserted disk is discriminated as the CD group disk through the processes, it is discriminated whether it is a recordable disk or a reproducing only disk, based on which a CD optical system and the laser diode are selected corresponding to the discriminated disk (stage: 915).

In this respect, in case of the CD group disk, the data detected by using the DVD optical system may not be sufficient to discriminate it. Thus, in terms of verification, a laser diode and an optical system for CD are selected and the disk discriminating processes are performed by using the CD optical system, thereby re-confirming the type of the discriminated disk (stage: 916).

Thereafter, after the focus servo is ON by the CD optical system and the light source, the maximum value, that is, the peak-to-peak voltage (Vpp), of the tracking error signal detected at the moment is detected (stage: 917). The maximum value of the tracking error signal can be used as a verification for the discriminated result.

And, after a disk recognizing number corresponding to the discriminated disk, that is, an ID, is set (stage: 918), a servo system (that is, tracking, focus, sled servo) corresponding to the set disk ID is operated (stage: 923). By operating the servo system at the stage 923, a disk data can be read from the inserted disk, thereby re-confirming the correctness of the discriminated disk. If the type of the inserted disk is accurately discriminated, the servo is quickly stabilized, so that the quality of the data to be recorded or reproduced can be improved significantly.

Meanwhile, in case where the inserted disk is discriminated as the DVD group by the comparison of the voltage level of the focus search wave form, as shown in FIGS. 3A through 3C or FIGS. 4A through 4C, a type of the DVD can be discriminated by the Vpp of the FE signal or the RF signal. That is, as shown in FIGS. 3B and 4B, in case of the DVD-ROM, the Vpp of the FE and of the RF, that is, the maximum value and the minimum value are great. And, as shown in FIGS. 3A and 4A, in case of the DVD-RW, the Vpp of the FE and of the RF has some size, that is, some level. And, as shown in FIGS. 3C and 4C, in case of the DVD-RAM, the Vpp of the FE and of the RF is the smallest.

This would say that in case of a DVD light source having 650 nm wavelength, the Vpp of the FE and of the RF is great in the order of DVD-ROM>DVD-RW>DVD-RAM. Thus, like the CD group disk, by setting a plurality of threshold values discriminating the DVD-ROM, DVD-RW and DVD-RAM and comparing them with the Vpp of the FE or the Vpp of the RF, the type of the DVD can be discriminated.

For example, on the assumption that threshold values for the FE signal are Vth3 and Vth4 and Vth3 is greater than Vth4, if the Vpp of the FE signal measured by the DVD optical system is greater than Vth3, the inserted disk is judged as the DVD-ROM; if the Vpp of the FE signal measured by the DVD optical system is smaller than Vth3 and greater than Vth4, the inserted disk is judged as the DVD-RW; and if the Vpp of the FE signal measured by the DVD optical system is smaller than Vth4, the inserted disk is judged as the DVD-RAM.

After the type of the inserted disk is judged as the DVD group disk and then it is judged whether it is a recordable disk or a reproducing only disk, the focus servo is ON (stage: 919) and the maximum value of the tracking error signal as detected, that is, the peak-to-peak voltage (Vpp), is detected (stage: 920). Namely, in case of the DVD group disk, in order to obtain more accurate data, the tracking error signal can be used for a verification whether the DVD-RAM and the DVD-RW were properly discriminated after the tracking error signal was detected in a state of free running.

The free running refers to detecting a tracking error signal by rotating only a disk without moving the pick-up in a state that a tracking servo is in an OFF state and a focus servo is in an ON state. For example, the tracking error signal can be detected by a push-pull method. At this time, due to the depth difference between the land and the groove (DVD-RAM is of $\lambda/6$ and DVD-RW is of $\lambda/12$), there is much difference between the levels of the TE signals detected from the DVD-RAM and DVD-RW. That is, as shown in FIGS. 7A through 7C, the level of the TE signal of the DVD-RAM is the greatest, the level of the TE signal of the DVD-ROM is the smallest, and the level of the TE signal of the DVD-RW is smaller than that of the DVD-RAM and greater than that of the DVD-ROM.

Therefore, like the above case, by setting a plurality of threshold values for discriminating the DVD-ROM, the DVD-RW and the DVD-RAM and comparing the Vpp of the TE with the threshold values, it is verified whether the type of the DVD was properly discriminated (stage: 921). At this time, the tracking error signal obtained by free running may be used for discrimination instead of the RF signal or the FE signal as well as being used for verification.

Thereafter, a disk ID corresponding to the discriminated disk is set (stage: 922), and a servo system (that is, tracking, focus, sled servo, etc.) is ON (stage: 923).

In the stage 923, when the servo system is ON, since the disk information can be read out from the inserted disk, it is re-confirmed whether the disk was accurately discriminated. Likewise in the CD, as the type of the inserted disk of the DVD group is accurately discriminated, the servo is quickly stabilized, and thus, the quality of the data to be recorded or reproduced can be improved significantly.

As so far described, according to the method for discriminating a type of an optical recording medium (e.g., a disk) of the present invention, when the disk is inserted, the focus searching is performed, and it is judged whether the inserted disk is a CD group disk or a DVD group disk by using the voltage level of the focus search wave form detected at the FZC position. Subsequently, after it is discriminated whether the discriminated disk is a recordable disk or a reproducing only disk in the same group disk by using the FE or RF level, a servo system is constructed corresponding to the discriminated disk, so that the disk is accurately discriminated, and thus, the servo is stably operated and the initial operation for recording/reproducing can be quickly stabilized.

In another embodiment, the DVD-RW, the DVD-RAM and the DVD-ROM of the DVD group can be discriminated on the basis of the TE level obtained by free running. The disk can be accurately discriminated, so that the servo can be stabilized more quickly. Also, the type of the CD group disk or the DVD group disk is automatically discriminated during the initial focus-searching, so that an error of the recording/reproducing operation can be reduced in a system of combination CD and DVD.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method for discriminating a type of an optical recording medium by detecting an RF signal and a focus error signal while performing a focus-searching as the optical recording medium is inserted, the method comprising:

a first discriminating step for detecting a focus zero cross position from a focus error signal inputted during focus-searching, and discriminating whether the optical recording medium belongs to a CD group or to a DVD group by using a level of a focus search wave form detected from the focus zero cross position; and a second discriminating step for discriminating whether the optical recording medium discriminated as belonging to the CD group or the DVD group in the first discriminating step is a reproducing-only recording medium or a recordable recording medium by using an RF signal level or a focus error (FE) signal level, wherein, in the first discriminating step, if no focus zero cross position is detected from the focus error signal, the inserted optical recording medium is judged as belonging to the CD group.

2. The method according to claim 1, wherein, in the first discriminating step, a reference level is set for the focus search wave form, and the level of the detected focus search wave form is compared with the reference level, to thereby discriminate whether the optical recording medium belongs to the CD group or the DVD group.

3. The method according to claim 1, wherein, in the first discriminating step, if the level of the detected focus search wave form is higher than a pre-set reference level, the inserted optical recording medium is judged as belonging to the CD group, while if it is lower than the pre-set reference level, the inserted optical recording medium is judged as belonging to the DVD group.

4. The method according to claim 1, wherein, in the first discriminating step, in case that the inserted optical recording medium is discriminated as belonging to the CD group, then CD-ROM, CD-R and CD-RW are discriminated on the basis of the level of the RF or the FE signal detected by using a light source for a DVD group in the second discriminating step.

5. The method according to claim 4, wherein threshold values Vth1 and Vth2 (Vth1>Vth2) are set for the RF levels, such that if the detected RF level is greater than Vth1, the inserted optical recording medium is judged as the CD-ROM; if the detected RF level is smaller than Vth1 and greater than Vth2, it is judged as the CD-R; and if the detected RF level is smaller than Vth2, it is judged as the CD-RW.

6. The method according to claim 4, wherein threshold values Vth3 and Vth4 (Vth3>Vth4) are set for the FE levels, such that if the detected FE level is greater than Vth3, the inserted optical recording medium is judged as the CD-ROM; if the detected FE LEVEL is smaller than Vth3 and greater than Vth4, it is judged as the CD-R; and if the detected FE level is smaller than Vth4, it is judged as the CD-RW.

7. The method according to claim 5, wherein in case that the inserted optical recording medium is judged as the CD-R, a threshold value Vth5 is set for the RF level, such that if the detected RF level is greater than the threshold value Vth5, the inserted optical recording medium is judged to belong to a CD-R metal group, while if the detected RF level is below the threshold value Vth5, it is judged to belong to a CD-R coloring group.

8. The method according to claim 6, wherein in case that the inserted optical recording medium is discriminated as belonging to a CD-R group, a threshold value Vth6 is set for the FE level, such that if a detected FE level is higher than the threshold value Vth6, the inserted optical recording medium is judged as belonging to a CD-R metal group, while if the detected FE level is lower than the threshold value Vth6, the inserted optical recording medium is judged as belonging to a CD-R coloring group.

9. The method according to claim 1, wherein in case that the inserted optical recording medium is discriminated as belonging to the DVD group in the first discriminating step, the DVD-ROM, DVD-R, DVD-RW and DVD-RAM are discriminated from the levels of the RF or FE detected by using a light source for a DVD group.

10. The method according to claim 9, wherein threshold values Vth1 and Vth2 are set for the RF levels, such that if a detected RF level is greater than Vth1, the inserted optical recording medium is judged as the DVD-ROM or the DVD-R; if a detected RF level is smaller than Vth1 and greater than Vth2, the inserted optical recording medium is judged as the DVD-RW; and if a detected RF level is smaller than Vth2, the inserted optical recording medium is judged as the DVD-RAM.

11. The method according to claim 9, wherein threshold values Vth3 and Vth4 (Vth3>Vth4) are set for FE levels, such that if a detected FE level is greater than Vth3, the inserted optical recording medium is judged as the DVD-ROM or the DVD-R; if a detected FE level is smaller than Vth3 and greater than Vth4, the inserted optical recording medium is judged as the DVD-RW; and if a detected FE level is smaller than Vth4, the inserted optical recording medium is judged as the DVD-RAM.

12. The method according to claim 10, wherein in case that the inserted optical recording medium is judged as the DVD-ROM or the DVD-R, if there is a WBL, the inserted optical recording medium is judged as the DVD-R, while if there is no WBL, the inserted optical recording medium is judged as the DVD-ROM.

13. The method according to claim 11, wherein when the optical recording medium in the first discriminating step is discriminated as belonging to the DVD group, then DVD-ROM, DVD-RW and DVD-RAM are judged on the basis of the level of a tracking error signal obtained by free running.

14. The method according to claim 1, wherein threshold values Vth1 and Vth2 (Vth1>Vth2) are set for tracking error levels, such that if a detected tracking error level is greater than Vth1, the inserted optical recording medium is judged as a DVD-RAM; if a detected tracking error level is smaller than Vth1 and greater than Vth2, the inserted optical recording medium is judged as a DVD-RW; and if a detected tracking error level is smaller than Vth2, the inserted optical recording medium is judged as a DVD-ROM.

15. The method according to claim 2, wherein, in the first discriminating step, if the level of the detected focus search wave form is higher than the reference level, the inserted optical recording medium is judged as belonging to the CD group, while if it is lower than the reference level, the inserted optical recording medium is judged as belonging to the DVD group.

* * * * *